(12) United States Patent
Maki et al.

(10) Patent No.: US 9,370,738 B2
(45) Date of Patent: Jun. 21, 2016

(54) FILTER CARTRIDGES AND MANIFOLDS FOR LINEAR MOTION INSTALLATION

(75) Inventors: Jeffrey M. Maki, Inver Grove Heights, MN (US); Jeremy A. Schmoll, Pine Island, MN (US); Tyan M. Renner, Eagan, MN (US); Matt R. Branscomb, Lakeville, MN (US); David W. Lachermeier, Chaska, MN (US); Richard A. Kirchner, Apple Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 362 days.

(21) Appl. No.: 13/981,478

(22) PCT Filed: Jan. 24, 2012

(86) PCT No.: PCT/US2012/022290
§ 371 (c)(1),
(2), (4) Date: Sep. 11, 2013

(87) PCT Pub. No.: WO2012/103046
PCT Pub. Date: Aug. 2, 2012

(65) Prior Publication Data
US 2013/0341261 A1 Dec. 26, 2013

Related U.S. Application Data

(60) Provisional application No. 61/435,630, filed on Jan. 24, 2011.

(51) Int. Cl.
*B01D 35/30* (2006.01)
*B01D 35/147* (2006.01)

(52) U.S. Cl.
CPC .............. *B01D 35/30* (2013.01); *B01D 35/147* (2013.01); *B01D 35/306* (2013.01); *B01D 2201/301* (2013.01); *B01D 2201/302* (2013.01); *B01D 2201/303* (2013.01); *B01D 2201/304* (2013.01);
(Continued)

(58) Field of Classification Search
None
See application file for complete search history.

(56) References Cited

U.S. PATENT DOCUMENTS 4,725,354 A * 2/1988 Thomsen ............... B01D 27/02
210/232
5,653,871 A * 8/1997 Thomsen ............... B01D 27/08
210/232

(Continued)

FOREIGN PATENT DOCUMENTS

DE 102007006970 9/2008
DE 102007017388 10/2008
(Continued)

OTHER PUBLICATIONS

International Search Report for PCT international Application No. PCT//US2012/022290, mailed on Apr. 5, 2012, 4 pages.

*Primary Examiner* — Benjamin Kurtz
(74) *Attorney, Agent, or Firm* — Aleksander Medved; Scott A. Baum

(57) ABSTRACT

Described are filter cartridges having an inlet opening and an outlet opening on the stem of the filter cartridges, which permit the permit the entry and exit, respectively, of a fluid in one or more radial directions perpendicular to the longitudinal axis of the stem. These filter cartridges are suitable for use in filtration systems that allow users to install the filter cartridges by a straight line push motion and remove the filter cartridges by a straight line pull motion.

21 Claims, 7 Drawing Sheets

(52) U.S. Cl.
CPC ... *B01D 2201/305* (2013.01); *B01D 2201/4061* (2013.01); *Y10T 29/49826* (2015.01)

(56) References Cited

U.S. PATENT DOCUMENTS

| | | |
|---|---|---|
| 7,442,301 B2 | 10/2008 | Huda |
| 2007/0199876 A1 | 8/2007 | Tubby |
| 2009/0289000 A1* | 11/2009 | Kim ................ B01D 35/30 210/137 |
| 2010/0116728 A1 | 5/2010 | Namur |
| 2010/0307964 A1 | 12/2010 | Namur |
| 2011/0139698 A1 | 6/2011 | Freystedt |
| 2011/0185762 A1 | 8/2011 | Kruckenberg |

FOREIGN PATENT DOCUMENTS

| | | |
|---|---|---|
| DE | 102008002727 | 12/2009 |
| EP | 0237257 | 9/1987 |
| WO | 2005/061073 | 7/2005 |
| WO | 2010/017003 | 2/2010 |

\* cited by examiner

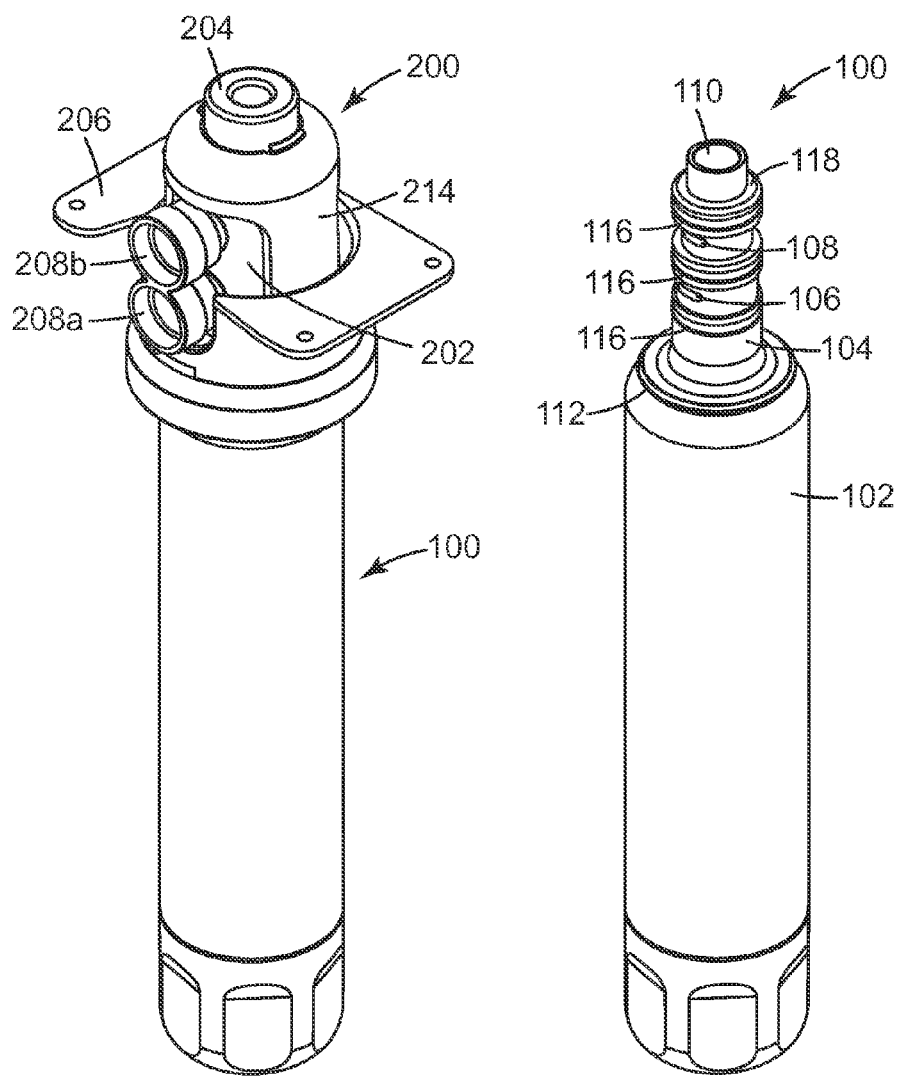
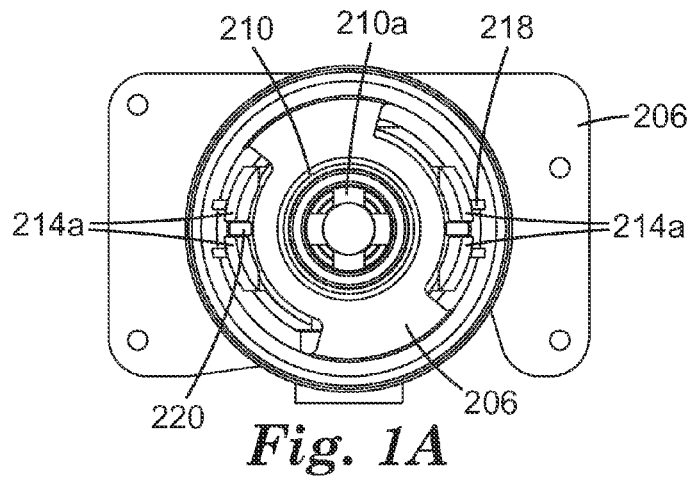

FILTER CARTRIDGES AND MANIFOLDS FOR LINEAR MOTION INSTALLATION

CROSS REFERENCE TO RELATED APPLICATIONS

This application is a national stage filing under 35 U.S.C. 371 of PCT/US2012/022290, filed Jan. 24, 2012, which claims priority to U.S. Provisional Patent Application No. 61/435,630, filed Jan. 24, 2011, the disclosures of which are incorporated by reference in their entirety herein.

TECHNICAL FIELD

Embodiments of the present invention relate to the field of fluid treatment, and more particularly to the field of filter cartridges, and manifolds and filtration systems using such filter cartridges, that are capable of installation by a straight line push motion.

BACKGROUND

Over the years, many water filtration systems and much of the current technology for interfaces between filter cartridges and manifolds are based around ¼ (quarter) turn bayonet styles. This type of interface tends to result in high removal forces due to the high compression on the sealing components (typically o-rings or other rubber-like types of seals), and the compression sets taken by the rubber-like seals. These ¼ turn devices require both a translational and rotational motion to install and remove the filter cartridge.

Newer styles of interfaces have employed external button release mechanisms. These mechanisms are typically high in force and add extra expense from an increase in components to the overall fluid filtration system. They can also disadvantageously also increase the overall size of the system. Furthermore, like the ¼ turn devices, two different motions are required to install and remove the filter cartridge for an external button system (one translational motion to push the button and one translational motion to move the filter cartridge).

Often, it is desirable to place the filter in a location within a refrigerator or other unit where a rotating filter is not possible. Also, some applications require more than one filter side-by-side, which also prevents a rotating filter cartridge from being feasible.

Linear motion designs for filtration systems have been developed that utilize push-activated lock mechanisms. Although the filter cartridges in these systems can be installed through a linear push-in motion, in order to remove these filter cartridges, the user must first push in the filter cartridge to unlock the mechanism, then pull the cartridge in the opposite direction to remove the filter cartridge from the manifold. Furthermore, these push-activated lock mechanisms are complicated to fabricate and implement, and thus increase the cost and complexity of the filtration system.

There is a need for cartridges and simple filtration systems that provide a filter cartridge which can be easily installed by a straight line push motion and removed through a straight line pull motion.

SUMMARY

Provided are filter cartridges that are amenable to straight line push and pull motion. Also, dual streams of flow can be achieved in a single stem. In so providing the filter cartridges are generally without orientation, and comprise two openings that permit only lateral inlet and outlet flow communication with a filter housed in the filter cartridge. One or more embodiments provide that the filter cartridge is secured in the manifold at one or more points of contact.

In a first aspect, provided is a filter cartridge for operatively engaging a manifold having a valve and a clip. In one or more embodiments of this aspect, the filter cartridge comprises a cartridge body, a stem, a shuttle actuator, a clip grab and a filter. In these embodiments, the stem has a proximal end and a distal end, the distal end of the stem extending from one end of the cartridge body. The stem comprises an inlet opening and an outlet opening between its proximal end and distal end, wherein the inlet opening and the outlet opening permit the entry and exit, respectively, of a fluid in one or more radial directions perpendicular to the longitudinal axis of the stem. The shuttle actuator has a proximal end and a distal end, the distal end of the shuttle actuator extending from the proximal end of the stem. The clip grab is on the exterior of the filter cartridge. The filter is disposed within the cartridge body and in fluid communication with the inlet opening and the outlet opening.

A second aspect of the present invention provides a filter cartridge for operatively engaging a manifold having a valve, and a clip. In embodiments of this aspect, the filter cartridge comprises a cartridge body, a stem, a shuttle actuator, a shoulder, a clip grab, and a filter. The cartridge body and the stem each have a proximal end and a distal end, with the distal end of the stem extending from the proximal end of the cartridge body and being axially aligned with the cartridge body. The stem comprises an inlet opening and an outlet opening between its proximal end and distal end, and the distance from the inlet opening to the distal end of the stem is less than the distance from the outlet opening to the distal end of the stem. The inlet opening and the outlet opening permit the entry and exit, respectively, of a fluid in one or more radial directions perpendicular to the longitudinal axis of the stem. The shuttle actuator has a proximal end and a distal end, the distal end of the shuttle actuator extending from the proximal end of the stem and the shuttle actuator having an outside diameter at its distal end that is less than an outside diameter of the stem at its proximal end. The shoulder is formed by the intersection of the proximal end of the stem and the distal end of the shuttle actuator. The clip grab is on the exterior of the filter cartridge, and the longitudinal distance from the clip grab to the distal end of the cartridge body is less than the distance from the inlet opening to the distal end of the cartridge body. The filter is disposed within the cartridge body and in fluid communication with the inlet opening and the outlet opening.

In another aspect, provided is a method of installing a filter cartridge into a manifold in a fluid filtration system that comprises a cartridge opening, a valve, and a clip. According to one or more embodiments of this aspect, the filter cartridge may be one described in the first aspect. The method comprises inserting the filter cartridge into the cartridge opening with a straight line push motion, and thereby opening the valve and engaging the filter cartridge with the clip of the manifold.

Another aspect provides method of installing a filter cartridge into a manifold in a fluid filtration system that comprises a cartridge opening, a valve, and a clip. In embodiments of this aspect, the filter cartridge may be one described in the second aspect. The method comprises inserting the filter cartridge into the cartridge opening with a straight line push motion, and thereby operatively engaging the shuttle with the shuttle actuator to expand the diameter of a portion of the shuttle, operatively engaging the shuttle with the shoulder to move the shuttle from a first position to a second position thereby opening the valve, and operatively engaging the clip grab with the clip to lock the filter cartridge into the manifold.

Another aspect pertains to a method of decreasing force on a filter cartridge upon installation into a manifold in a fluid filtration system. Embodiments of this aspect provide that the method comprises providing a filter cartridge that is without orientation and is suitable for straight line push motion insertion. In one or more embodiments, the filter cartridge comprises two openings that permit only lateral inlet and outlet flow communication with a filter housed in the filter cartridge and the filter cartridge is secured in the manifold at one or more points of contact.

Yet another aspect provides a fluid filtration system for receiving and withdrawing a filter cartridge by a linear push and pull motion. In embodiments of this aspect, the system comprises a manifold assembly and a filter cartridge, such as one described in the first aspect. The manifold assembly comprises a cartridge opening, an inlet port and an outlet port, a shuttle that is movable in a linear direction and has one or more tabs that are flexible or expandable, a clip that is adjacent the shuttle and is movable in a linear direction, and a clip opening cam. The inlet port and outlet port of the manifold assembly are in fluid communication with inlet opening and outlet opening, respectively, of the filter cartridge.

In another aspect, provided is a manifold comprising a cartridge opening, a shuttle, an inlet port, an outlet port, and a clip. The clip can comprise a clip closing cam and a clip opening cam. The shuttle can comprise an inlet channel and an outlet channel. The manifold also has a manifold tip. In embodiments of this aspect, the shuttle is movable in a linear direction from a first position to a second position. In the first position, there is no fluid communication between the inlet and/or outlet ports and the internal area of the shuttle. That is, the inlet and outlet channels of the shuttle are not aligned with the inlet and outlet ports, respectively. In the second position, the inlet and outlet channels of the shuttle are aligned with the inlet and outlet ports, respectively. The shuttle has one or more expandable tabs, which lock the shuttle in the first position when they are not expanded. The tabs can expand upon actuation by, for example, a shuttle actuator. Upon expansion of the tabs and movement of the shuttle into the second position, the tabs move into a hollow portion of the manifold tip. The clip closing cam and clip opening cam facilitate closing and opening, respectively, of the ends of the clip upon motion of the shuttle. The end of the clip can engage with, for example, a clip grab of a filter cartridge inserted into the manifold.

BRIEF DESCRIPTION OF THE DRAWINGS

The disclosure may be more completely understood in consideration of the following detailed description of various embodiments of the disclosure in connection with the accompanying drawings, in which:

FIG. 1 is an isometric view of a manifold in accordance with an embodiment;

FIG. 1A is an end-on view of the manifold;

FIG. 2 is a isometric view of a filter cartridge in accordance with an embodiment;

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Figure 3A:
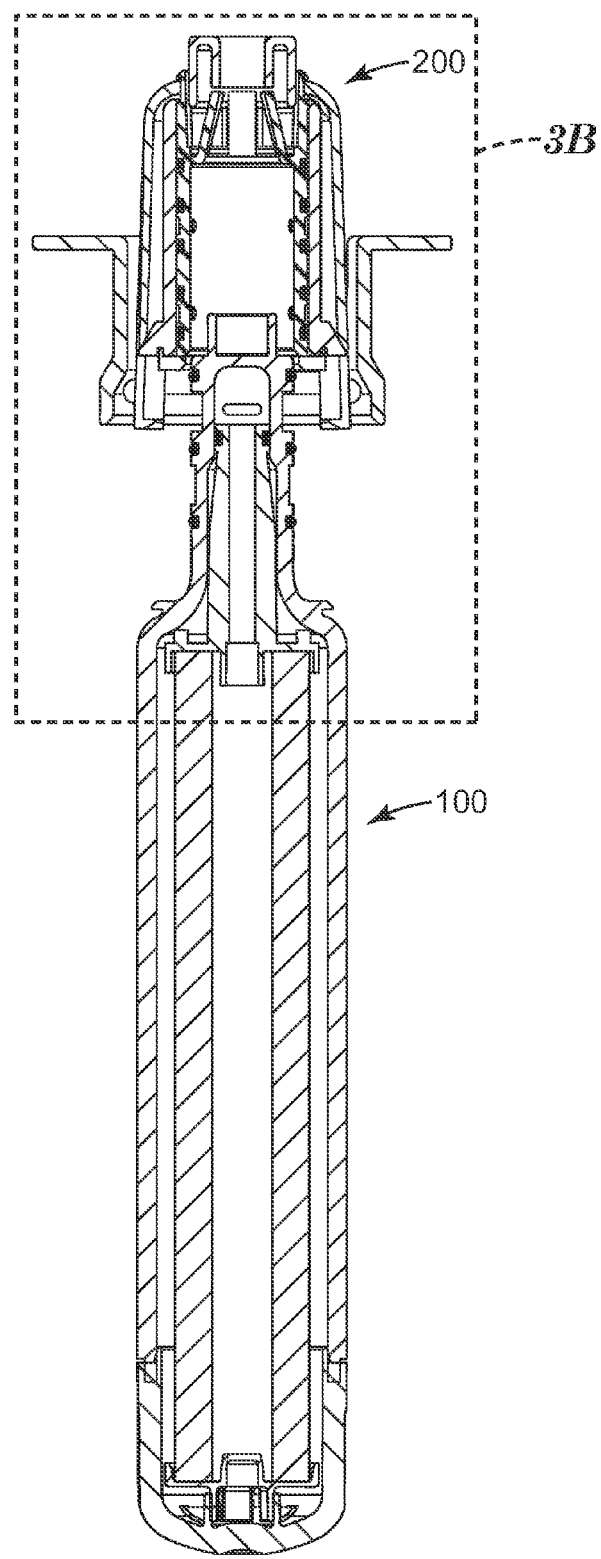
FIGS. 3A, 4A, and 5A are cross-sectional views of the manifold and filter cartridge during different points of installation/withdrawal.

As described above, many applications prevent the use of rotational filter cartridges such as ¼ turn devices. However, current filtration systems that have a push-in filter cartridge utilize complex push-activated lock mechanisms, and require both a push and a pull motion in order to remove the filter cartridge. It has been found, however, that a relatively simple filtration system can be provided in which the filter cartridge can be installed through a straight line push motion and removed through a straight line pull motion. Such a filter cartridge may have one stem with both an inlet opening and an outlet opening, which permit the entry and exit, respectively, of a fluid in one or more radial directions perpendicular to the longitudinal axis of the stem. Such a filter cartridge may provide motion to one, two, or more components of a manifold upon installation and/or withdrawal.

Reference to "valve" as used herein refers to a structure or combination of elements that regulate flow of fluid to or from the filter cartridge. For example, one or more embodiments provide that the valve comprises a shuttle housing, inlet and outlet ports, and a shuttle.

As used herein, a "shuttle" refers to a component in a manifold that is movable between two positions, where a first position prevents flow into the internal area of the shuttle and a second position permits such flow. For example, in the second position, channels in the shuttle align with ports, which allows flow through to the internal area of the shuttle.

As used herein, the term "proximal end" refers to the end of a feature nearest the manifold tip. As shown in the figures, the proximal end of a feature is nearest the top of the page.

As used herein, the term "distal end" refers to the end of a feature nearest the bottom of the filter cartridge and farthest from the manifold tip. As shown in the figures, the distal end of a feature is nearest the bottom of the page.

As used herein, the term "longitudinal axis" refers to the axis running from the distal end to the proximal end of an object, and through the center of the object.

As used herein, the term "radial" or "lateral" refers to one or more directions perpendicular to the longitudinal axis of an object.

Before describing several exemplary embodiments of the invention, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Turning to the figures, FIG. 1 shows an isometric view of a manifold 200 having a shuttle housing 202, which has an inlet port 208a and an outlet port 208b that are in fluid communication with openings of a filter cartridge. A manifold tip 204 is at one end of the manifold, opposite the end where the filter cartridge 100 is inserted and connected to the manifold. A bracket 206 aids in assembling the manifold into an appliance such as a refrigerator. The bracket 206 can be configured to retain various parts within the manifold.

FIG. 1A provides an end-on view of the manifold 200 at the cartridge opening 216 (not labeled in FIG. 1A) through to the manifold tip 204. The shuttle 210 has shuttle tabs 210*a*. When shuttle tabs 210*a* are unflexed, the shuttle 210 is fixed in a first position, which corresponds to the manifold valve being closed. When shuttle tabs 210*a* are flexed, the shuttle 210 is movable within the manifold 200 from the first position to a second position closer to the manifold tip 204, which enables the manifold valve to open. Shuttle tabs 210*a* are shown as having a configuration of four tabs spaced equally apart, but other configurations are possible. For example, a shuttle may include more or fewer shuttle tabs or have different spacing between tabs. In a particular embodiment, shuttle tabs 210*a* are randomly spaced. Clip ends 214*a* are the portion of clip 214 (not shown) which clip onto a clip grab of the filter cartridge. Clip ends 214*a* are shown as a configuration of two groups of two clip ends 180° apart, but other configurations are possible, including more or less clip ends or different spacing between clip ends. In a particular embodiment, clip ends 214*a* are randomly spaced about the 360° circumference. Clip closing cam 218 and clip opening cam 220 facilitate the closing and opening of the clip 214 so that clip ends 214*a* engage and disengage, respectively, the clip grab. According to one or more embodiments, clip closing cam 218 may be integral to clip 214 and clip opening cam may be integral to shuttle housing 202.

FIG. 2 provides an isometric view of the filter cartridge 100. The filter cartridge can be without orientation. A cartridge body 102 contains a filter 114 (not shown in FIG. 2). Extending from the cartridge body 102 is a stem 104. The stem can have an outside diameter that is smaller than the outside diameter of the cartridge body. On the proximal end of the cartridge body 102 is a clip grab 112. The clip grab 112 can be shaped to engage with the clip ends of the manifold. In one or more embodiments, the clip grab 112 is symmetrical. In particular embodiments, the clip grab 112 is circular or substantially circular. An inlet opening 106 and an outlet opening 108 are provided in the stem. When the filter cartridge 100 is assembled with the manifold 200, the inlet opening 106 and the outlet opening 108 are in fluid communication with the inlet port 208*a* and the outlet port 208*b*, respectively. One or more O-rings 116 between inlet opening 106 and outlet opening 108 are provided to keep inlet fluid and outlet fluid from the filter cartridge separate during use. As shown in FIG. 2, other O-rings 116 may be provided to create a seal and prevent fluid from leaking from the connection between the inlet and outlet openings and the manifold 200. For example, there can be at least one O-ring between the proximal end of the stem and the outlet opening and at least one O-ring between the inlet opening and the distal end of the stem. A shuttle actuator 110 is at one end of the filter cartridge, and shuttle actuator 110 engages with the shuttle 210 and shuttle tabs 210*a* upon insertion of the filter cartridge 100 into the manifold 200. The shuttle actuator can have an outside diameter that is smaller than the outside diameter of the stem.

One or more embodiments provide that the shuttle actuator has dimensions adapted to open the valve in the manifold. Specifically, the shuttle actuator can have dimensions adapted to expand or flex one or more tabs of a shuttle in the manifold when inserted into the manifold and the shoulder has dimensions adapted to move the shuttle. Some embodiments provide that upon a straight line push motion insertion of the filter cartridge into the manifold, the valve is opened and the filter cartridge engages with the clip of the manifold. Specifically, upon insertion of the filter cartridge into the manifold, the shuttle actuator can expand or flex one or more tabs of a shuttle of the valve, the shoulder can move the shuttle from a first position to a second position thereby opening the valve, and the clip grab can engage the clip.

Shoulder 118 is located at the base of the shuttle actuator 110. In the embodiment shown in FIG. 2, shoulder 118 is formed by the intersection of the shuttle actuator 110 and the proximal end of stem 104. According to one or more embodiments, the outside diameter of the shuttle actuator 110 at its distal end is less than the outside diameter of the stem 104 at its proximal end.

Inlet opening 106 and outlet opening 108 permit the entry and exit, respectively, of a fluid in one or more radial directions perpendicular to the longitudinal axis of the stem 104. As a result, the forces created by the flow of fluid in and out of the filter cartridge 100 are perpendicular to the longitudinal axis of the stem 104. In contrast, other filter cartridges often have inlet and/or outlet openings that permit the entry and/or exit of fluid in the axial direction, which creates an axial force that pushes against the filter cartridge/manifold connection. Thus, these other filter cartridges cannot be used in a filtration system which would allow removal by a straight line pull motion, or else this axial force would push the filter cartridge out of the manifold. However, by replacing the axial force with a radial or lateral force, it is possible to have a filtration system with a cartridge filter removable by a straight line pull motion, as the pressure is balanced without the need for a strong locking mechanism. Thus, certain embodiments of the present invention provide that the end wall at the intersection of the shuttle actuator 110 and the stem 104 does not have an opening in fluid communication with the filter 114.

The clip grab 112 may be attached to the exterior of the filter cartridge 100, or it may be integral to a component of the filter cartridge, such as the cartridge body 102 or the stem 104. According to one or more embodiments, clip grab 112 may comprise a ridge surrounding at least a portion of the perimeter of the exterior of the filter cartridge 100. As shown in FIG. 2, in some embodiments the clip grab 112 may surround the entire circumference of the exterior of the filter cartridge 100. In certain embodiments, the outside diameter of the ridge is in the range from about 3 to about 4 cm. In a particular embodiment, the outside diameter of the ridge is about 3.4 cm.

Although the clip grab 112 in FIG. 2 is shown on the proximal end of the cartridge body 102, the clip grab can be placed in many possible positions on the exterior of the filter cartridge 100. For example, the clip grab 112 may be positioned on the stem 104, on the neck connecting the stem 104 and the cartridge body 102, or on the cartridge body 102. According to one or more embodiments, the ratio of the longitudinal distance from the proximal end of the shuttle actuator 110 to the distal end of the shuttle actuator 110 to the longitudinal distance from the proximal end of the shuttle actuator 110 to the clip grab 112 is in the range from about 1:5 to about 1:10, particularly in the range from about 1:6 to about 1:8. In certain embodiments, the ratio of the longitudinal distance from the proximal end of the shuttle actuator 110 to the distal end of the shuttle actuator 110 to the longitudinal distance from the proximal end of the shuttle actuator 110 to the clip grab 112 is about 1:7. According to one or more embodiments, the longitudinal distance from the proximal end of the shuttle actuator 110 to the distal end of the shuttle actuator 110 is in the range from about 0.5 to about 1 cm and the distance from the proximal end of the shuttle actuator 110 to the clip grab 112 is from about 4 to about 6 cm. In a particular embodiment, the longitudinal distance from the proximal end of the shuttle actuator 110 to the distal end of the shuttle actuator 110 is about 0.8 cm and the distance from the proximal end of the shuttle actuator 110 to the clip grab 112 is about 5.5 cm.

According to one or more embodiments, the shuttle actuator has particular dimensions adapted to expand the tabs of the shuttle and the shoulder has particular dimensions adapted to engage the shuttle to move it from one position to another. In certain embodiments, the shuttle actuator has a ratio of the outside diameter at its distal end to the distance from its proximal end to its distal end in the range of about 2:1 to about 1:1. In a particular embodiment, this ratio is about 3:2.

Although other dimensions may be operative, these particular dimensions have been found to be effective for expanding the tabs of the shuttle and for moving the shuttle, and are suitable for use in common appliances such as refrigerators.

The filter cartridge 100 in FIG. 2 is without orientation, meaning that it can be inserted into a manifold without regard to which radial direction the inlet opening 106 and outlet opening 108 are facing. With the exception of the inlet and outlet openings, the exterior of the filter cartridge embodiment shown in FIG. 2 is radially symmetric. As such, the user can insert the shuttle actuator end of the filter cartridge shown in FIG. 2 without having to line up any openings or fittings.

FIG. 3A shows a cross-sectional view of the manifold 200 and filter cartridge 100 during initial insertion of the filter cartridge 100 into the manifold 200.

Figure 3B:
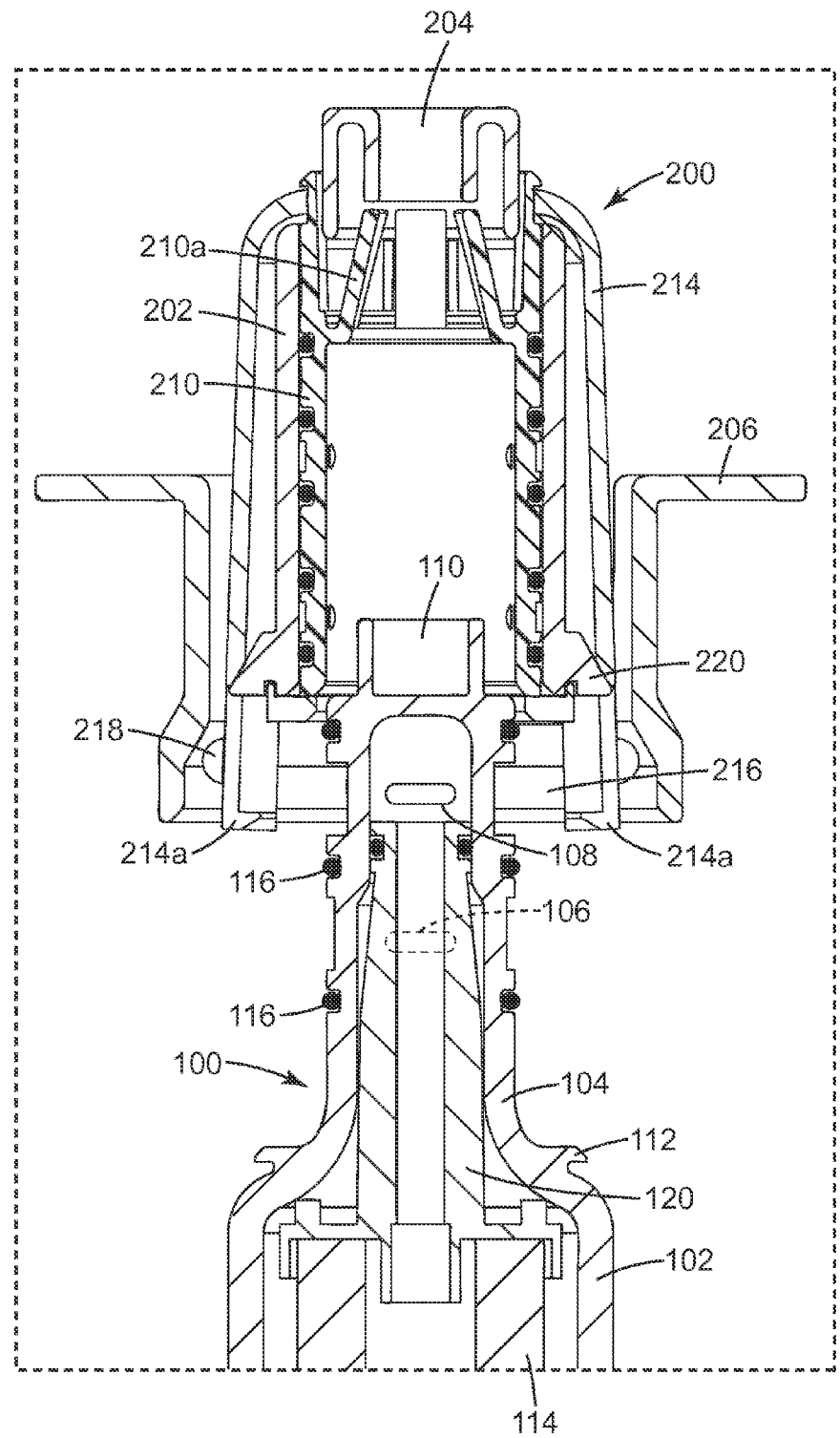
FIGS. 3B, 4B, and 5B are close-up views of FIGS. 3A, 4A, and 5A, respectively.

Further elements of the manifold and filter cartridge are visible in the view of FIG. 3B. Shuttle 210 is encased in the shuttle housing 202. Clip 214 circumferentially surrounds the shuttle housing 202 at the end near the manifold tip 204, but may not surround the entire circumference of the shuttle housing 202 at or near the clip ends 214a. Bracket 206 encases the clip 214 and shuttle housing 202.

The inlet opening 106 and the outlet opening 104 of the filter cartridge are in fluid communication with the filter 114. A flow separator 120 may be disposed within the cartridge body 102 and/or the stem 104, to prevent the inlet fluid (unfiltered fluid) from mixing with the outlet fluid (filtered fluid). That is, the flow separator can be disposed within the cartridge body such that the inlet opening is in fluid communication with an inlet of the filter and an outlet of the filter is in fluid communication with the outlet opening. If the filter 114 has a particular flow orientation, then the flow separator 120 may comprise an inlet flow channel in fluid communication with the inlet opening and the inlet of the filter 114 and an outlet flow channel in fluid communication with the outlet of the filter 114 and the outlet opening. In a particular embodiment, the inlet flow channel is surrounded by the outlet flow channel such that the inlet flow channel is radially within the outlet flow channel.

In FIG. 3B, for insertion of the filter cartridge into the manifold, initially, the shuttle actuator 110 enters the cartridge opening 216, followed by the shoulder 118 and the proximal end of the stem 104. The shuttle 210 is in the first position and the manifold valve is closed.

Figure 4A:
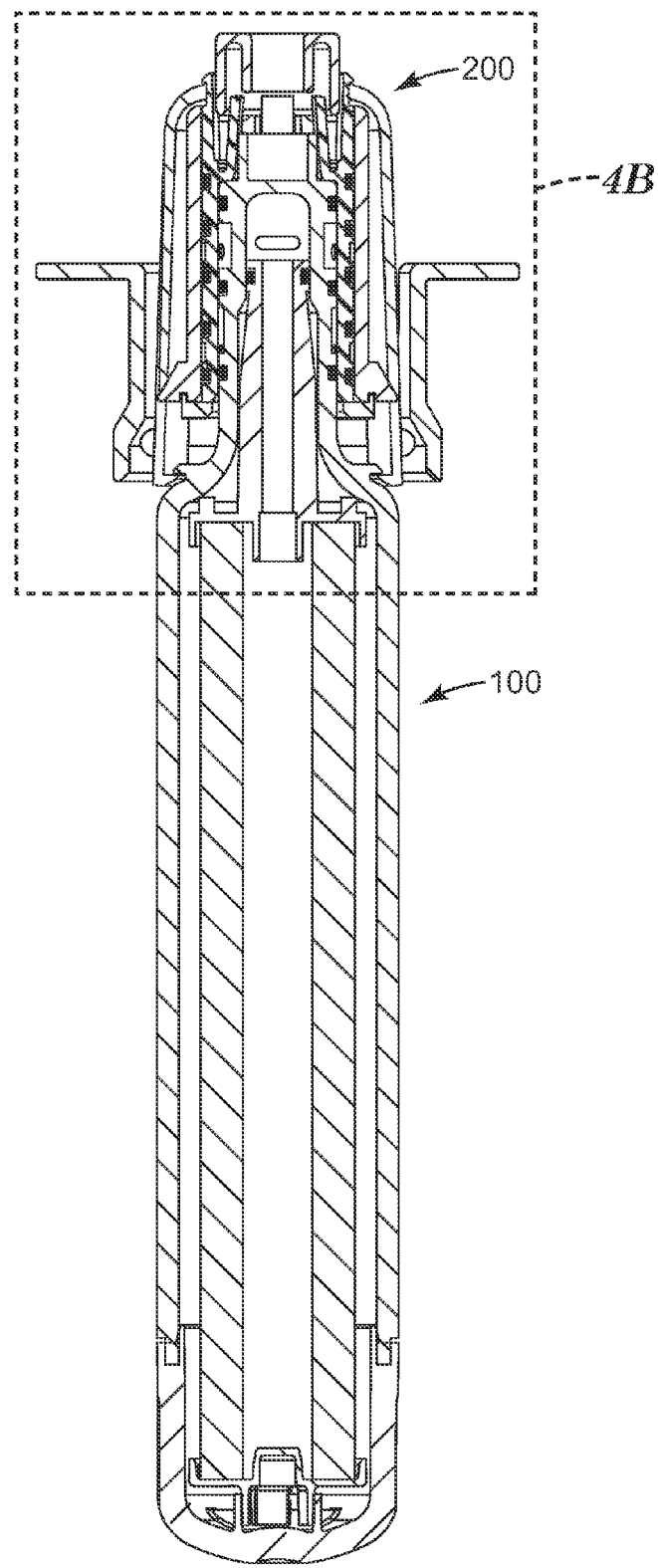
Figure 4B:
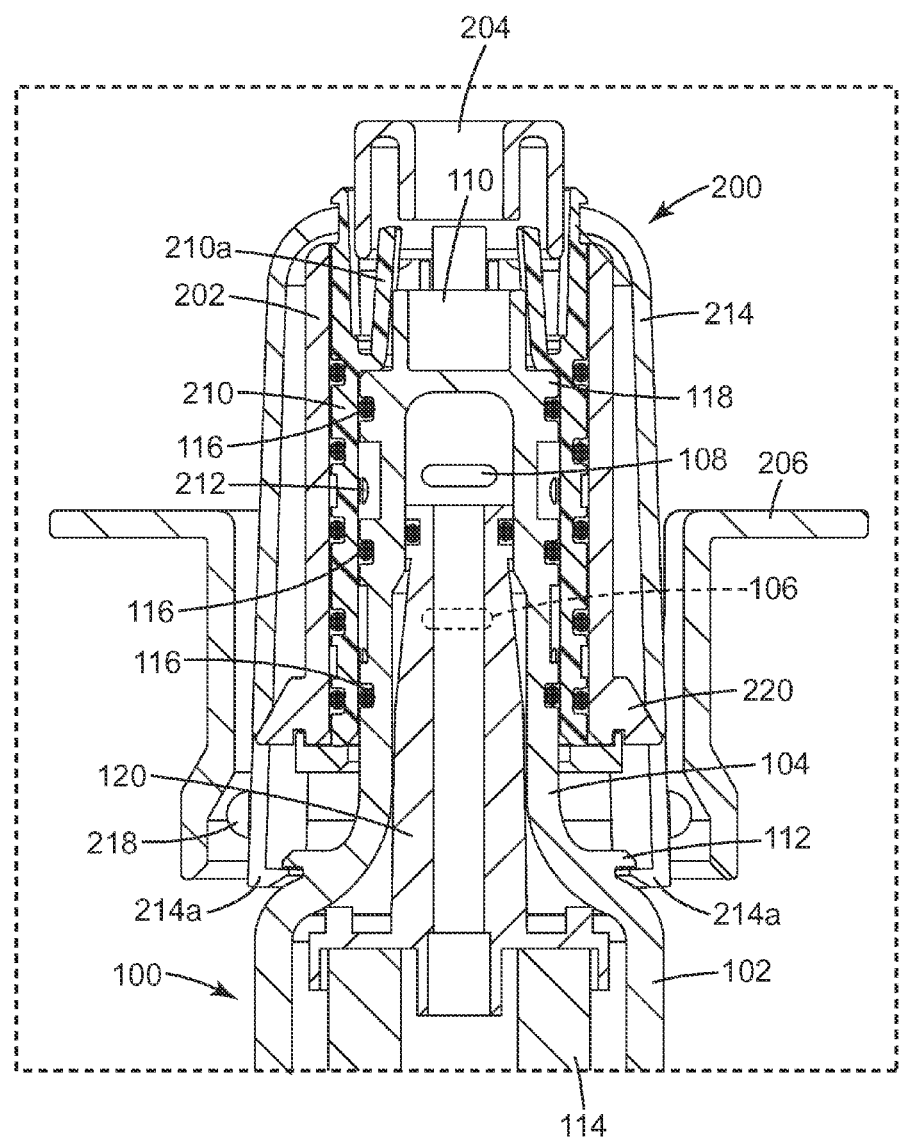

FIG. 4A shows a cross-sectional view of the manifold 200 and filter cartridge 100 after initial insertion of the filter cartridge 100 into the manifold 200 and once the stem 104 is entirely within the manifold 200. In FIG. 4B, when the filter cartridge 100 is moving axially within the manifold 200, the shuttle actuator 110 expands or flexes shuttle tabs 210a of the shuttle 210 such that the shuttle tabs 210a can move into a hollow portion of manifold tip 204. This effectively "unlocks" the shuttle 210 and allows the shuttle 210 to move axially from the first position. Shoulder 118 is configured to engage a corner of shuttle 210, and further pushing of the filter cartridge 100 into the manifold moves the shuttle 210 toward the manifold tip 204. However, until the shuttle 210 moves to the second position, flow channels 212 are offset from inlet port 208a and outlet port 208b (not shown), so the manifold valve is still in the closed position. The clip ends 214a begin to engage the clip grab 112.

Figure 5A:
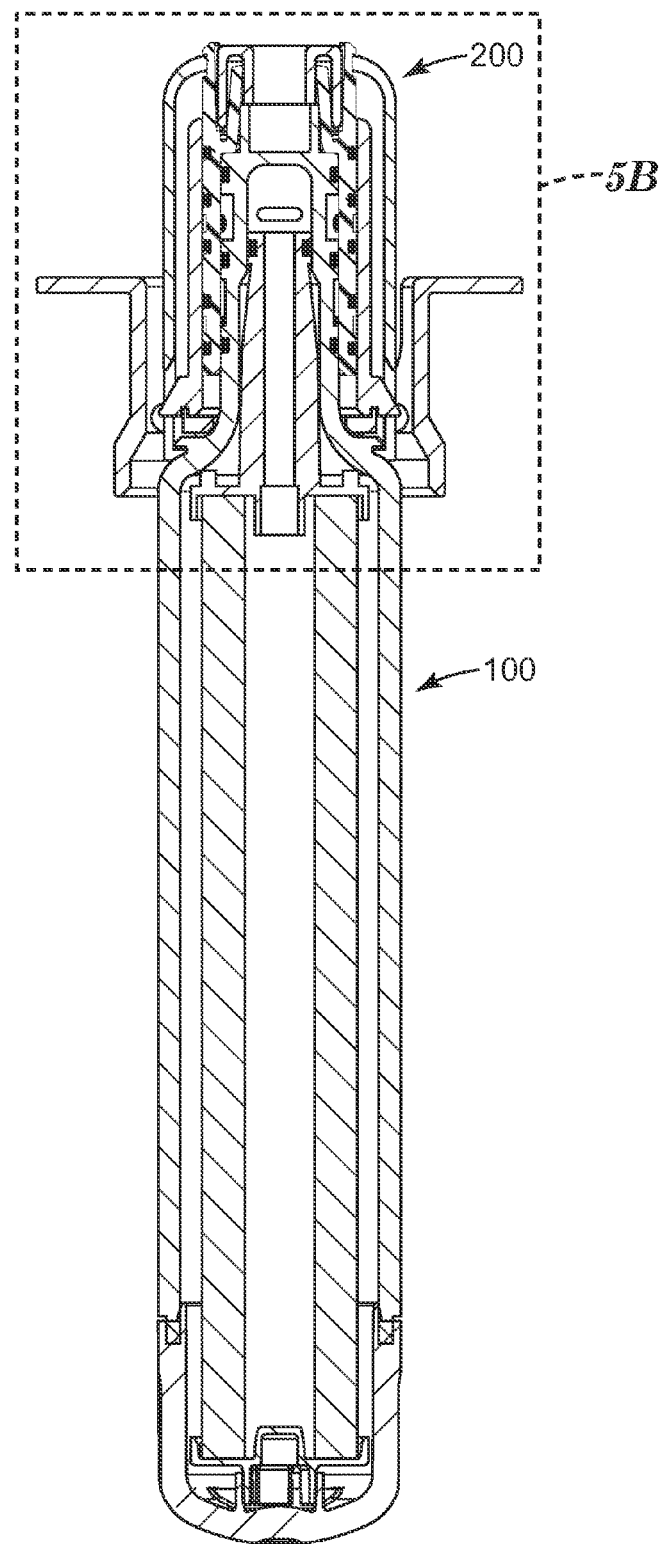
Figure 5B:
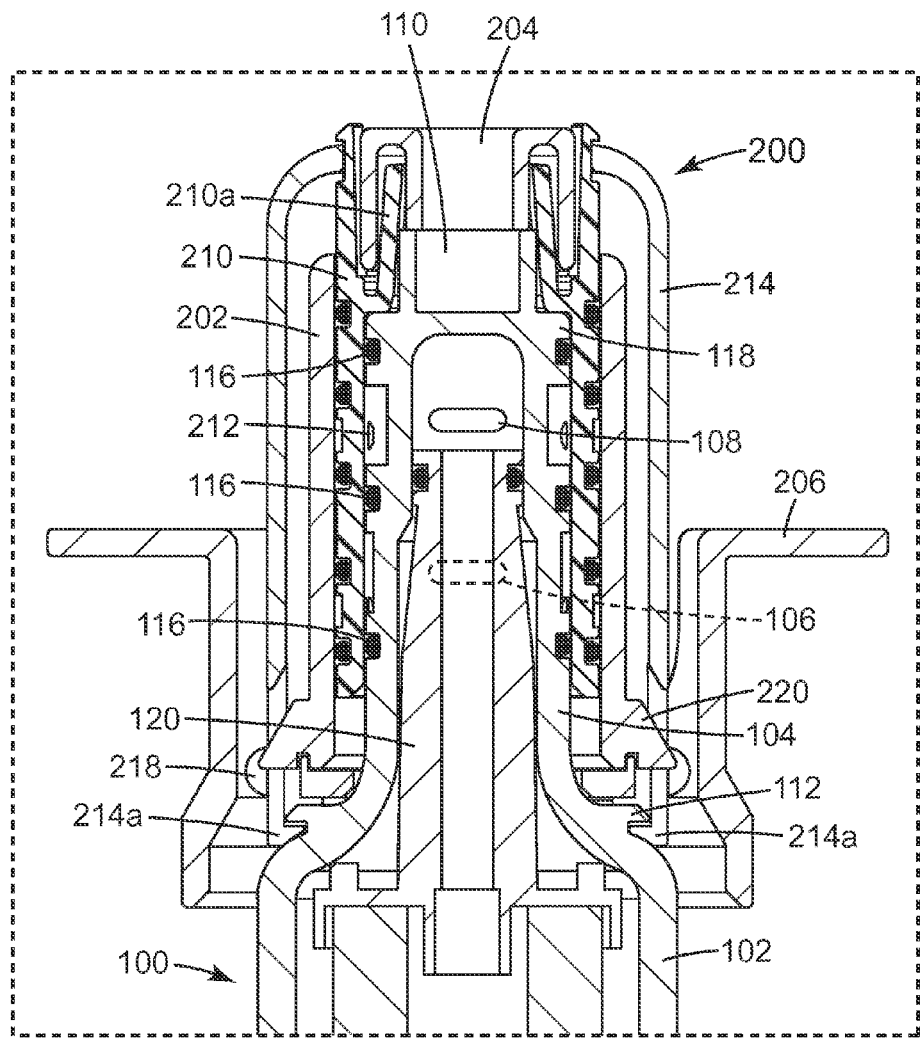

FIG. 5A shows a cross-sectional view of the manifold 200 and filter cartridge 100 upon complete insertion of the filter cartridge 100 into the manifold 200. In FIG. 5B, when the filter cartridge 100 is completely inserted within the manifold 200, clip closing cam 218 is aligned with a portion of bracket 206 with a smaller diameter than the diameter of the bracket 206 at the opening 216, which applies a force on clip ends 214a such that they actively engage the clip grab 112.

The shuttle 210 is now in the second position, with flow channels 212 lined up with the inlet port 208a nd outlet port 208b (not shown), thus enabling fluid communication between the flow channels 212 and the inlet/out ports 208a/208b. Thus, the manifold valve is now in the open position. The inlet opening 106 and outlet opening 108 are also aligned with the flow channels 212, so the inlet/outlet openings 106/108 are now in fluid communication with the inlet port and outlet port (not shown), respectively, through flow channels 212. Water flows into the inlet port 208a, through a first flow channel 212 and into the inlet opening 106. Water flows from the inlet opening 106 to the inlet side of flow separator 120, then into the filter 114. After filtration, water flows from filter 114 to the outlet side of flow separator 120 to the outlet opening 108. The water then exits the filter cartridge 100, flows through a second flow channel 212 and out the outlet port 208b. Although the filter cartridge and manifold are described with a specific flow orientation, it is possible for opening 108 to be the inlet opening and opening 106 to be the outlet opening in order to have a flow in the reverse orientation.

When removing the filter cartridge, the clip grab 112 pulls the clip ends 214a and the rest of clip 214 axially. The clip 214 also moves the shuttle 210 axially.

As the shuttle 210 returns to the first position, the flow channels 212 no longer line up with the inlet/outlet ports 208a/208b and the manifold valve is closed, thus preventing water from leaking as the filter cartridge 110 is withdrawn. Clip opening cam 220 has an angled surface, so as clip 214 slides past the clip opening cam 220, the clip 214 is forced open to disengage clip ends 214a from the clip grab 112 and release the filter cartridge 100. When shuttle actuator 110 is removed from shuttle tabs 210a, the shuttle tabs 210a unflex and the shuttle 210 is locked from axial movement.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A filter cartridge for operatively engaging a manifold having a valve and a clip, the filter cartridge comprising:
   a cartridge body having a proximal end and a distal end;
   a stem having a proximal end and a distal end, the distal end of the stem extending from the proximal end of the cartridge body and being axially aligned with the cartridge body, the stem comprising an inlet opening and an outlet opening between its proximal end and distal end, wherein the distance from the inlet opening to the distal end of the stem is less than the distance from the outlet opening to the distal end of the stem, and the inlet opening and the outlet opening permit the entry and exit, respectively, of a fluid in one or more radial directions perpendicular to the longitudinal axis of the stem;

a shuttle actuator having a proximal end and a distal end, the distal end of the shuttle actuator extending from the proximal end of the stem and having an outside diameter at its distal end that is less than an outside diameter of the stem at its proximal end;

a shoulder that is formed by the intersection of the proximal end of the stem and the distal end of the shuttle actuator;

an O-ring groove on the stem located between the proximal end of the stem and the outlet opening;

a clip grab on the exterior of the filter cartridge, wherein the longitudinal distance from the clip grab to the distal end of the cartridge body is less than the distance from the inlet opening to the distal end of the cartridge body; and a filter disposed within the cartridge body and in fluid communication with the inlet opening and the outlet opening.

2. The filter cartridge of claim 1, wherein the shuttle actuator has a circular receptacle.

3. The filter cartridge of claim 1, wherein the shuttle actuator has dimensions adapted to expand or flex one or more tabs of a shuttle in the manifold when inserted into the manifold.

4. The filter cartridge of claim 3, wherein the shoulder has dimensions adapted to move the shuttle.

5. The filter cartridge of claim 1, wherein upon insertion of the filter cartridge into the manifold, the shuttle actuator expands or flexes one or more tabs of a shuttle of the valve, the shoulder moves the shuttle from a first position to a second position thereby opening the valve, and the clip grab engages the clip.

6. The filter cartridge of claim 1, wherein the filter cartridge is without orientation.

7. The filter cartridge of claim 1, wherein the shuttle actuator does not have an opening in fluid communication with the filter.

8. The filter cartridge of claim 1, further comprising a flow separator disposed within the cartridge body such that the inlet opening is in fluid communication with an inlet of the filter and an outlet of the filter is in fluid communication with the outlet opening.

9. The filter cartridge of claim 8, wherein the flow separator and the cartridge body define an inlet flow channel in fluid communication with the inlet opening and an outlet flow channel in fluid communication with the outlet opening, wherein the outlet flow channel is radially within the inlet flow channel.

10. The filter cartridge of claim 1, further comprising one or more O-rings between the proximal end and the distal end of the stem.

11. The filter cartridge of claim 1, wherein at least one O-ring is located between the outlet opening and the inlet opening on the stem.

12. The filter cartridge of claim 1, further comprising at least one O-ring between the proximal end of the stem and the outlet opening and at least one O-ring between the inlet opening and the distal end of the stem.

13. The filter cartridge of claim 1, wherein the filter cartridge has a ratio of the distance from the proximal end of the shuttle actuator to the distal end of the shuttle actuator to the distance from the proximal end of the shuttle actuator to the clip grab is in the range of about 1:6 to about 1:8.

14. The filter cartridge of claim 1, wherein the distance from the proximal end of the shuttle actuator to the distal end of the shuttle actuator is in the range of about 0.5 cm to 1.0 cm and the distance from the distal end of the shuttle actuator to the clip grab is in the range of about 4 cm to about 6 cm.

15. The filter cartridge of claim 1, wherein the shuttle actuator has an outside diameter in the range of about 1 cm to about 1.4 cm at its proximal end.

16. The filter cartridge of claim 1, wherein the shuttle actuator has a ratio of the outside diameter at its distal end to the distance from its proximal end to its distal end in the range of about 2:1 to about 1:1.

17. The filter cartridge of claim 1, wherein the clip grab comprises a ridge surrounding at least a portion of a perimeter of the exterior of the filter cartridge.

18. The filter cartridge of claim 17, wherein the ridge has an outside diameter in the range of about 3 to about 4 cm.

19. The filter cartridge of claim 1, wherein the clip grab is integral to the exterior of the cartridge body.

20. A method of installing a filter cartridge into a manifold in a fluid filtration system that comprises a cartridge opening, a valve, and a clip, the method comprising the steps of:

providing the filter cartridge of claim 1;

inserting the filter cartridge into the cartridge opening with a straight line push motion, and thereby operatively engaging the shuttle with the shuttle actuator to expand the diameter of a portion of the shuttle, operatively engaging the shuttle with the shoulder to move the shuttle from a first position to a second position thereby opening the valve, and operatively engaging the clip grab with the clip to lock the filter cartridge into the manifold.

21. The method of claim 20, further comprising:

withdrawing the filter cartridge from the manifold with a straight line pull motion, and thereby operatively disengaging the shuttle actuator from the shuttle to allow one or more tabs of the shuttle to unflex; and moving the clip from a first position to a second position thereby engaging the clip with the shuttle to move the shuttle from the second position to the first position thereby closing the valve, and operatively engaging a clip opening cam of the manifold with the clip to operatively disengage the clip from the clip grab to unlock the filter cartridge from the manifold.

* * * * *